United States Patent [19]

Wingefeld et al.

[11] Patent Number: 5,043,121

[45] Date of Patent: Aug. 27, 1991

[54] PROCESS FOR REMOVING POLYACETAL BINDER FROM MOLDED CERAMIC GREENBODIES WITH ACID GASES

[75] Inventors: Gerd Wingefeld, Hofheim, Fed. Rep. of Germany; Walter Hassinger, Union City, N.J.

[73] Assignee: Hoechst Celanese Corp., Somerville, N.J.

[21] Appl. No.: 518,598

[22] Filed: May 3, 1990

[51] Int. Cl.⁵ .............................................. C04B 38/04
[52] U.S. Cl. ......................................... 264/82; 264/63; 264/211.11; 264/328.2; 264/344
[58] Field of Search .............. 264/63, 82, 344, 211.11, 264/328.2

[56] References Cited

U.S. PATENT DOCUMENTS

| 2,939,199 | 6/1960 | Strivens | 25/156 |
| 4,197,118 | 4/1980 | Wiech, Jr. | 75/228 |
| 4,283,360 | 8/1981 | Henmi et al. | 264/63 |
| 4,404,166 | 9/1983 | Wiech, Jr. | 419/36 |
| 4,619,798 | 10/1986 | Tanaka et al. | 264/63 |
| 4,624,812 | 11/1986 | Farrow et al. | 264/63 |
| 4,661,315 | 4/1987 | Wiech, Jr. | 419/10 |
| 4,765,950 | 8/1988 | Johnson | 419/2 |
| 4,820,462 | 4/1989 | Nakajima et al. | 264/63 |
| 4,836,965 | 6/1989 | Hayashi et al. | 264/82 |

Primary Examiner—James Derrington
Attorney, Agent, or Firm—DePaoli & O'Brien

[57] ABSTRACT

A process for rapidly removing the binder from a greenbody composed of a sinterable powder dispersed within a polyacetal binder is achieved by contacting the molded ceramic greenbody with an acid which depolymerizes the polyacetal binder.

25 Claims, 3 Drawing Sheets

PROCESS FOR REMOVING POLYACETAL BINDER FROM MOLDED CERAMIC GREENBODIES WITH ACID GASES

BACKGROUND OF THE INVENTION

The present invention relates to an improved process for making ceramic articles from extrusion or injection moldable ceramic compositions. More particularly, the present invention is directed to a process for binder removal from a molded ceramic greenbody containing ceramic powder and a polyacetal binder.

Ceramic materials are of critical importance for a number of high temperature, high performance applications. Recently, there has been substantial interest in the development of ceramic compositions for critical engine parts including reciprocating engines, gas turbine and rocket engines. These applications require a unique combination of properties such as high specific strength, high temperature mechanical property retention, low thermal and electrical conductivity, hardness and wear resistance, and chemical inertness. However, the inability to produce complex shapes of high dimensional accuracy and sufficient strength using an economical fabrication technique has prevented ceramic materials from fulfilling their potential in these critical high temperature, high performance applications.

Several processes have been used in an attempt to form ceramic bodies. Among such processes include pressing ceramic powder into a greenbody followed by sintering or by hot pressing and subsequently shaping or machining the sintered body to produce the finished product. Another technique is slip casting in which the ceramic particles are dispersed in water, the slurry placed in a mold and the water removed to form a greenbody. The pressing techniques have been found unsuitable to form ceramic articles of complex shapes and which must meet specific design specifications. The slip casting technique is limited since it allows for only parts which have uniform thickness.

In view of the problems associated with the prior techniques, injection molding has been increasingly used to form ceramic articles. Injection molding is a process wherein a moldable composition is forced into a mold or die. The injection molding process facilitates a rapid and repeated forming of a plurality of articles having a consistency with close dimensional tolerance. The injection molding process also minimizes the amount of shaping or machining that may be required to produce a finished article.

The whole injection molding process to form a ceramic article typically involves forming a ceramic greenbody by injection molding a composition comprising ceramic powder dispersed within a thermoplastic polymer, burning out the polymer, and sintering the resulting porous greenbody to a dense ceramic part with the same shape. The thermoplastic binder acts as a fluidizing agent to distribute the injection pressure throughout the mold and as the material which holds the ceramic particles in the shape of the mold after the part is ejected. A typical ceramic powder/thermoplastic polymer composite has a very high content of ceramic particles, typically from about 50 to about 87 volume % and a minimum of binder material to hold the particles together in the desired shape. A useful binder material for ceramic injection molding is a polyacetal resin as disclosed in U.S. Pat. No. 4,624,812, the entire contents of which are herein incorporated by reference.

A typical injection moldable ceramic composition will also contain a minor binder component which is often a thermoplastic, wax or oil, plasticizers which increase the fluidity of the ceramic-binder mixture, and processing aids such as surfactants which improve the wetting characteristics between the plastic binder and ceramic during mixing to form the composite.

A summary of injection molding applied to the fabrication of molded ceramic bodies is provided in an article entitled "Review: Fabrication of Engineering Ceramics by Injection Molding. I. Materials Selection", M. J. Edirisinghe et al, *International Journal of High Technology Ceramics, Vol. II*, 1986, pp. 1-31.

A major problem with regard to the formation of ceramic articles by injection molding relates to the difficulty of removing the binder such as by a thermal degradation process. Often, during binder burn-out, the generation of internal pressures from gaseous decomposition products disrupts the integrity of the greenbody such as in the formation of cracks, blisters and other surface deformities. To reduce the effects of the escaping gaseous decomposition products from the binder, it is often necessary to utilize an extremely flat temperature profile during the burn-out stage. Unfortunately, a slow rise in temperature to achieve binder burn-out results in an excessively long time, i.e., greater than 10 days and even greater than 20 days, before the binder is removed, thereby greatly reducing the commercial viability of the injection molding process to form ceramic articles.

Also, the rate of extraction of the binder depends on the thickness of the greenbody in an inverse relationship, i.e., the thicker the cross section of the greenbody, the longer it takes to extract the binder. In general, the rate of binder extraction is limited as a result of the generation of gaseous decomposition products which tend to disrupt the integrity of the greenbody and reduced extraction efficiency as degradation products build up within the greenbody. The result is often the introduction of practical constraints for part wall thickness in order to keep the process economical as well as the use of very flat temperature profiles which as discussed previously greatly lengthens the burn-out process and, thus, reduces the economic viability of the injection molding process for producing ceramic articles.

An alternative process for removing the binder is to extract the binder from the molded part with a solvent either in liquid or gaseous form. Solvent extraction of the binder, for example, is disclosed in U.S. Pat. No. 2,939,199. Typical solvents utilized to extract binders from ceramic greenbodies include acetone, methylethyl ketone, carbon tetrachloride, trichloroethylene, methylene chloride, etc. However, it is known that when the binder and solvent are mixed together, the binder-solvent mixture has a tendency to expand. If the binder is the solid state, it cannot readily move within the greenbody and the expansion within the greenbody can become greater than the forces holding the particulate material together. The result is often cracking which is further accentuated in the final firing step. Attempts have been made to reduce the cracking which occurs in the molded ceramic greenbodies when using solvent extraction as the binder removal process. For example, U.S. Pat. No. 4,197,118 discloses a process of removing the binder by a gaseous solvent in which the greenbody is heated to allow the binder to melt and wherein the gaseous solvent is then contacted with the greenbody at that point. While the patent states that such process reduces the swelling forces of the solvent and binder, the solvent is still dissolving the binder as a whole. Accordingly, the bulky binder component must still be passed through the interstices of the greenbody. It is very difficult to remove the binder as a bulk molecule from the ceramic greenbody without causing disruptions in the greenbody itself as the bulk compound passes through the pores of the greenbody. To eliminate cracking, the process has to be run at a slow rate of contact with the solvent, thus, again vastly reducing the economic gain achieved by the injection molding process.

While the use of polyacetal binding agents as disclosed in the aforementioned U.S. Pat. No. 4,624,812 is advantageous since the polyacetal depolymerizes relatively easily during the burn-out process, sharp temperature profiles tend to cause disruptions on the article's surface in the form of cracks and blisters. The use of a flat temperature profile, on the other hand, results in excessive time to completely remove the binder. Such time can be in excess of 50 hours. Accordingly, the thermal degradation of the polyacetal binder from the ceramic greenbody is difficult to accomplish in an economical manner.

It is therefore an object of this invention to provide an improved process for forming ceramic articles by the injection molding process. A further object of this invention is to provide an improved process for removing the organic binder from a molded ceramic greenbody in which a polyacetal resin is used as the binder. It is still a further object of this invention to provide an improved process for removing a polyacetal binder from a molded ceramic greenbody without disrupting the surface of the formed ceramic article and which binder removal process can be achieved in a substantially shorter time than previously contemplated.

SUMMARY OF THE INVENTION

It has now been found that a molded ceramic composition utilizing a polyacetal binder can be subjected to treatment with acid gases at elevated temperature to remove the polyacetal binder. The acid gases remove the polyacetal binder in a substantial shorter time than has been achieved utilizing binder burnout procedures and achieve binder removal without cracking.

Thus, in accordance with the present invention, molded ceramic articles, and, in particular, ceramic greenbodies which contain a ceramic or metal powder dispersed within a polyacetal binder are subjected to a binder removal processes which involves contacting the ceramic greenbody with an acid gas which reacts with the polyacetal binder to depolymerize the binder to formaldehyde. Since formaldehyde is a small molecule, it can easily diffuse through the porous structure of the greenbody without generating any defects such as the formation of cracks or blisters which occur in the processes of the prior art. Moreover, the binder removal process of this invention allows substantially shorter binder removal times on the order of 10 hours or less without the formation of defects in the samples.

DESCRIPTION OF THE PREFERRED EMBODIMENTS

Figure 1:
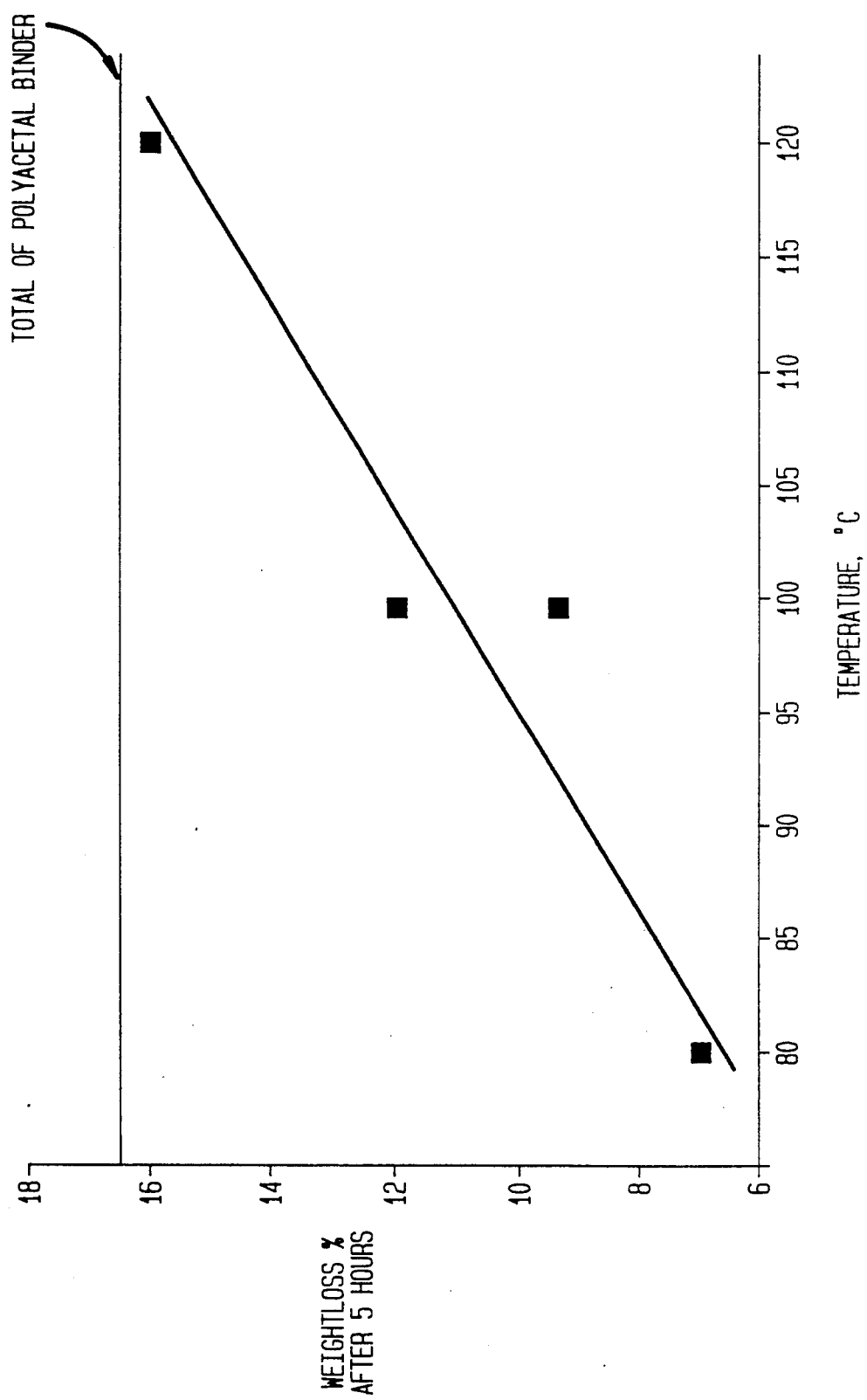

The ceramic powder employed in the moldable compositions of the present invention is selected according to the designed function of the molded article as is known to those with skill in the art. Typical ceramic powders include aluminum oxide ($Al_2O_3$), zirconium oxide (preferably calcium oxide-stabilized $ZrO_2$), silicon dioxide (preferably fused $SiO_2$), silicon nitride ($Si_3N_4$), silicon carbide (SiC), silicon, ferrite and mixtures thereof. In its broadest aspect, the present invention is directed to any sinterable composition which can be injection molded. Thus, metal and metal alloy powders may be used in accordance with the process of this invention.

To obtain a sintered molded article which exhibits excellent characteristics, the ceramic powder should be selected and/or treated such that close packing of powder particles may be obtained. In particular, important factors for particle packing are particle size distribution and the degree of agglomeration. To obtain optimum packing, a broad distribution of particle sizes is desirable as is well known to those having ordinary skill in the art.

The degree of agglomeration is a function of the size of the individual particles. The smaller the particle size, the greater the surface attraction and strength of electrostatic forces which leads to a higher degree of agglomeration. While the specific particle size employed will depend on the chemical compound selected for the ceramic powder and the function of the molded article, the average particle size will typically be in the range of from about 0.1 to about 30 microns, preferably from about 0.5 to about 10 microns. The shape of the individual particles also effects agglomeration with spheres yielding the greatest density, cylindrical rods with slightly lowered density and dagger-shaped fibers with yet lower density.

In the interest of completeness, it should be pointed out here that powder packing is also affected by the particle array. However, since this is principally a random occurrence in the context of the present invention, a further discussion of this factor is not believed to be warranted.

In the event that the particles of the available ceramic powder are too large or are of a shape which yields a low packing density, treatment of the powder may lead to improved results. Such treatment may be accomplished through either wet or dry ball milling, jet milling with the particles propelled by gas to promote impact thereof, or other types of milling techniques whereby the particle size is reduced and the particle shape altered. Thus, for example, aluminum oxide available from Alcoa (A16SG) may be ball milled with 0.5% oleic acid to reduce the degree of agglomeration. Similarly, milling of needle-shaped particles of silicon nitride will improve the packing density. However, in this instance, care should be taken such that the degree of agglomeration of the milled silicon nitride is not increased to an extent whereby the overall improvement is negligible.

The ceramic composition of the present invention also includes a binding agent in an amount ranging from about 10 to 50%, preferably from about 15 to about 35% by weight of the total mixture which serves to maintain the integrity of the shaped article prior to sintering. The binding agent is a polyacetal having the recurring unit —$OCH_2$—. Preferably, the polyacetal binding agent will contain at least 50 mole % of such oxymethylene recurring units. The term "polyacetal" and the recurring unit should be understood to encompass both homopolymers and copolymers which will be discussed in detail below.

The polyacetals employed in the present invention are per se known in the art. For example, polyacetals commercially available under the registered trademark Celcon may be prepared by polymerizing trioxane in accordance with teachings of U.S. Pat. No. 3,027,352, the contents of which are hereby incorporated by reference.

The polyacetal binding agents of the present invention yield numerous advantages. In particular, the polyacetals can readily depolymerize to small molecules of formaldehyde through an unzipping of the polymer chain. The volatile material is a clean burning fuel that does not leave any undesirable or difficultly removable residue. The ready depolymerization of the polyactal allows for quicker removal of the binding agent from the ceramic greenbody than is the case of, for example, a polypropylene binder.

A yet further significant advantage of the use of polyacetals as the binding agent is that by selecting certain comonomers, copolymer binding agents may be tailored to the specific ceramic powder employed. More specifically, trioxane can be polymerized with ethylene oxide, dioxolane, substituted dioxolanes, trioxane and 1,4-dioxane in amounts ranging from about 2 to about 80 mole % of the total comonomers present. Such copolymers contain both oxymethylene units and oxyalkylene units of 2 or more carbon atoms and can provide a lower melting point, lower crystallinity and increased softness and flexibility. For instance, by copolymerizing dioxolane with trioxane in substantially equimolar proportions, a copolymer binding agent which is particularly suitable for aluminum oxide ceramic powder may be obtained.

The binding agent may also be comprised of small amounts of from about 1.0 to about 10% by weight of known materials which serve an additional binding function. Such materials include low density polyethylene, atactic polypropylene, ethylene vinyl acetate and waxes such as stearic acid and paraffin wax.

In addition to the ceramic powder and the binding agent, the ceramic composition of the present invention may further contain conventional amounts of wetting agents, plasticizers and other types of processing aids which are added to the composition to obtain a suitable rheological system for molding. Specifically, from about 0.1 to about 5.0% by weight of wetting agents or surfactants can promote adhesion between the ceramic powder and the binding agent thereby reducing the degree of agglomeration. Suitable wetting agents or surfactants include lignite, mineral oil and low molecular weight waxes. Plasticizers in an amount of from about 1.0 to about 10% by weight decrease the viscosity of the composition to promote mixing. Typical plasticizers include waxes, silicones, alkyl phthalates, polyalkylene (e.g., polyethylene) glycols and linear saturated polyesters. Mold release agents in an amount of from about 0.05 to about 2.0% by weight prevent adhesion to the mold wall thereby facilitating removal of the shaped article from the mold. Typical mold release agents include silicones and various phthalates and amides such as Acrawax C and Hoechst Microwax C (a fatty acid amide).

To mold the ceramic composition into shaped articles, the selected ceramic or metal powder is initially dispersed or mixed in the binding agent. Preferably, the ceramic compositions are essentially free of solvent. Also present at this time are any additives which are to be included in the composition. Mixing of the ceramic powder, the binding agent and any additives is performed in the absence of oxygen to preclude oxidation of the ceramic powder. This may be achieved by conducting the mixing operation in a vacuum or under an inert atmosphere such as nitrogen or argon.

To obtain a homogenous mixture, the components of the composition are first mixed with low shear at a temperature of from about room temperature to about 200° C. for from about 5 minutes to about 60 minutes. The composition is then sheared in this temperature range for from about 5 to about 30 minutes. If the mixture has been heated, it is thereafter cooled, while mixing under shear is continued. For example, the temperature is reduced from about 200° to about 170° C. The resulting mixture should have a viscosity of less than about 1,000 poise at a shear rate of 1,000 sec$^{-1}$ as measured by a capillary rheometer at a temperature in the range of from about 100° to about 300° C.

The mixture is next extruded at a die temperature in the range of from about 190° to about 220° C. and a pressure in the range of from about 500 to about 2000 psig. Extrusion can be achieved by various pieces of equipment known to those of ordinary skill in the art.

Alternatively, a mixer-extruder may be employed which intimately mixes the components of the composition in a substantial absence of air and then extrudes the mixture.

Subsequent to the extrusion step, the extrudate is chipped or chopped to obtain pieces of the composition which are in the range of from about 1/16 to about ¼ inch in maximum dimension. While extrusion and chipping may be eliminated and the composition directly extrusion or injection molded, it is preferably extruded and then chipped or chopped into pieces which may be readily fed into a hopper feeder of a conventional extruder or injection molding machine. The chipped composition is then heated to a temperature from about 175° to about 200° C., and injected at a pressure in the range from about 500 to about 1000 psig. into a cold mold (i.e., from about room temperature to about 150° C.) where the composition hardens. Pressure is maintained on the composition until hardening is achieved. Typically, this requires from about 20 to about 60 seconds.

Removal of the binder from the molded greenbody is achieved in accordance with the present invention by contacting the greenbody with an acid gas. The acids useful in the process of this invention including any mineral acid such as, for example, sulfuric, nitric and hydrochloric acids. The acid gases are not merely solvents as in the prior art but react with the polyacetal binder to unzip the polymer chain and cause formation of small molecules of gaseous formaldehyde and other small molecular weight species which can easily diffuse through the treated porous greenbody. The other organic additives, if present, are not decomposed under the process conditions and remain to give some strength to the greenbody. Subsequent to reaction of the polyacetal binder with the acid gases, the remaining secondary binder materials can be removed by conventional thermal degradation processes. The secondary materials are easily diffused through the porous structure of the greenbody subsequent to the removal of the polyacetal primary binder.

A great advantage of the process of this invention is that the removal of the binder can take place at relatively low temperature. Thus, reaction of the acid gas with the polyacetal binder can take place at temperatures from about 70° to 200° C. Preferably, the temperature for removal of the binder takes place at temperatures ranging from about 80° to 120° C. At temperatures less than 120° C., removal of the polyacetal binder can be achieved in about 10 hours. At 120° C., the polyacetal binder can be removed in about 5 hours without damaging the ceramic greenbody.

The acid gases can be contacted with the greenbody as a saturated vapor or may be carried to the substrate in an inert carrier gas such as nitrogen.

Subsequent to binder removal, the temperature is raised to that required for sintering the ceramic powder. While the rate of final temperature will naturally depend upon the characteristics of the ceramic powder and the shaped article, a rate of temperature increase will generally be in the range of from about 50 to about 1000 degrees per hour until a temperature at a range from about 1000° to about 1800° C. is obtained. To fully sinter the ceramic powder, the shaped article is held at final temperature for about 15 minutes to about 8 hours. Sintering is generally undertaken in an atmosphere composed of air or an inert gas.

By the present invention, various sintered articles may be prepared. Such articles include electrical insulators, furnace elements, crucibles, heat exchange tubes, molds and cores for metal casting and other applications known to those of ordinary skill in the art.

To obtain a more complete understanding of the present invention, the following examples of preparing shaped molded articles is set forth. It should be understood, however, that the invention is not limited to the specific details set forth therein.

EXAMPLE 1

A molded ceramic greenbody was formed from the following composition:
Silicon powder: 77.3 wt. %
Celcon M 450[1]: 16.6 wt. %
Polyethylene glycol: 3.3 wt. %
Hoechst Microwax C: 1.0 wt. %
Stearic Acid: 1.9 wt. %

[1] A polyacetal copolymer. Hoechst Celanese Corporation

The molded greenbody was placed in a small Lindberg furnace. The temperature in the furnace was initially at 90° C. and was raised 2½ hours later to 110° C. Nitrogen was bubbled through a concentrated HCl solution and purged through the furnace. Purging was maintained for 24 hours. After 24 hours, the weight loss of the greenbody was determined with an analytical balance. Weight loss after 24 hours was 15.85%. The sample had no visible defects.

EXAMPLE 2

A series of experiments were run to determine the effects of time and temperature on the binder removal process of the present invention utilizing acid gases. Thus, molded greenbodies formed from the composition set forth in Example 1 above were treated for binder removal as in Example 1 in which nitrogen bubbled through hydrogen chloride gas was passed through a furnace which contained the greenbody sample. The weight loss of the sample was determined by an analytical balance in all cases. Results are plotted in FIGS. 1-3.

FIG. 1 illustrates that for exposure times of about 5 hours, temperatures of at least 120° C. were needed to obtain substantially complete removal of the polyacetal binder.

Figure 2:
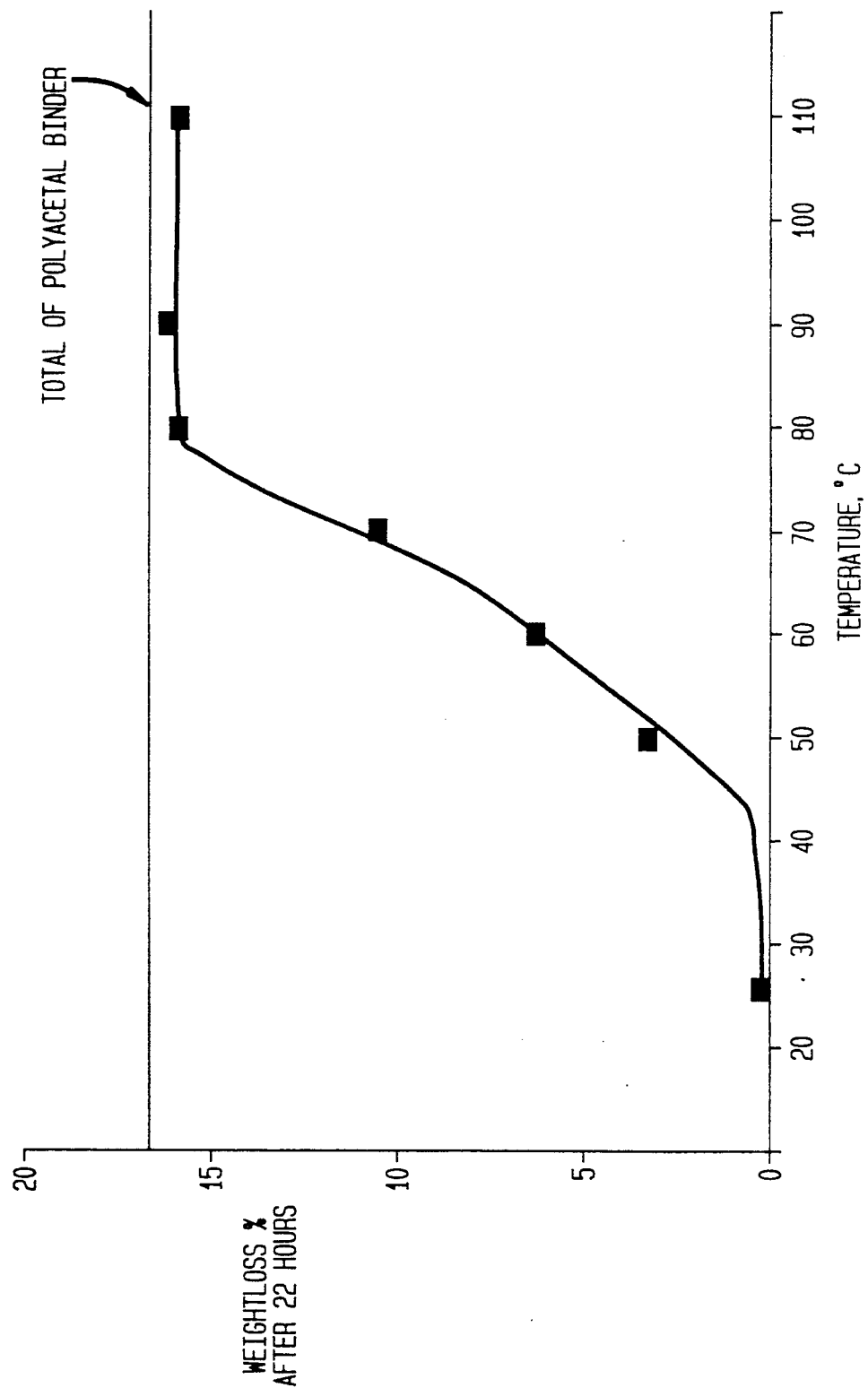

Referring to FIG. 2, it can be seen that a temperature of at least about 70° C. was needed to provide adequate binder removal in a useful time period of just over 20 hours. Substantially complete binder removal was achieved at 80° C. after 22 hours.

Figure 3:
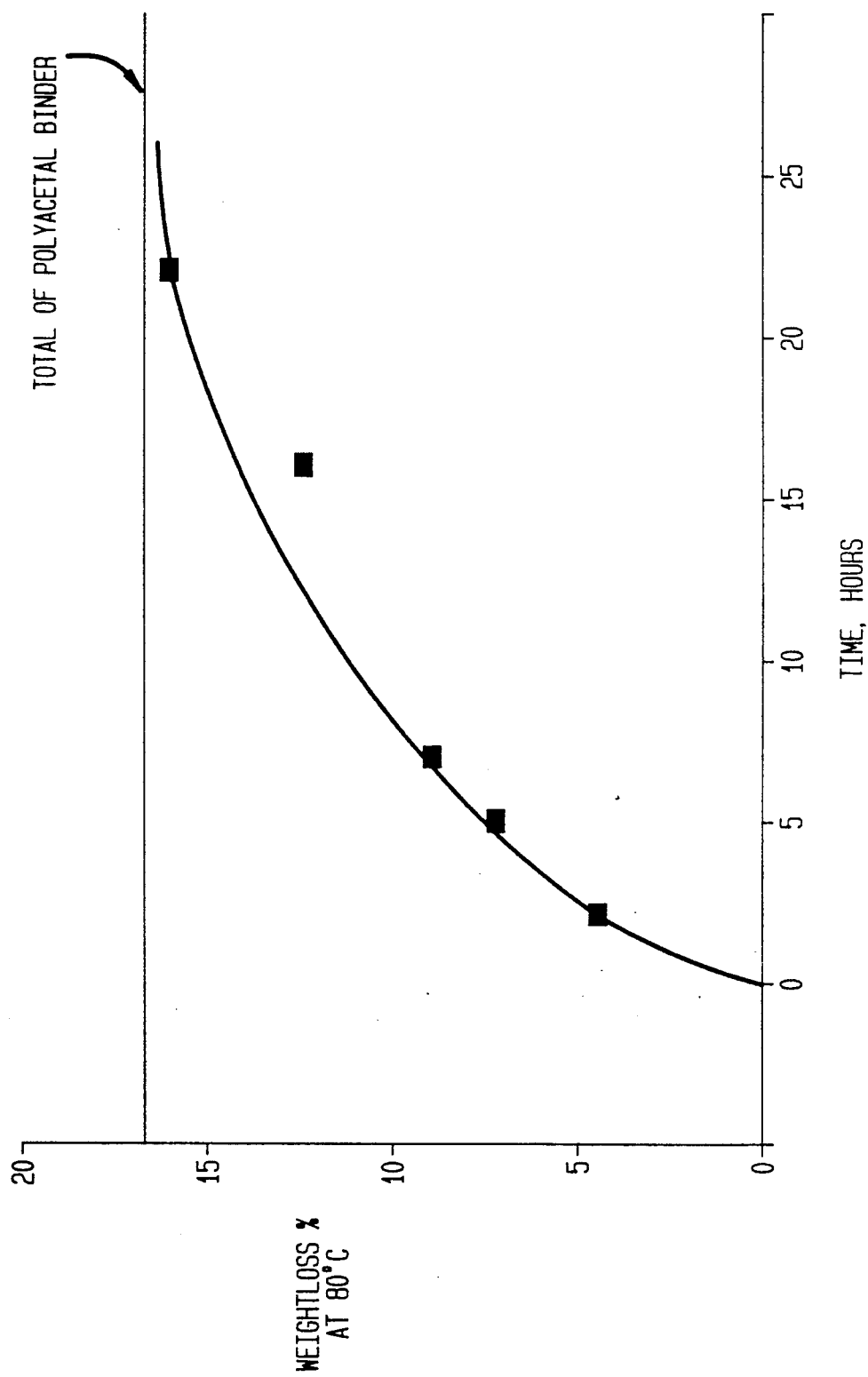

FIG. 3 essentially confirms the results of FIG. 2 that at 80° C., approximately 22 hours are required to obtain substantially complete removal of the polyacetal binder. Although not shown, it has been found that if pure HCl is used as the acid gas, binder removal times can be reduced to less than about 5 hours to complete removal of the polyacetal binder.

What is claimed is:

1. A process for removing a binder material from a molded ceramic greenbody which has been formed by molding a ceramic composition containing a sinterable powder dispersed within a polyacetal binder, comprising contacting said molded ceramic greenbody with an acid which reacts with said polyacetal binder so as to depolymerize said polyacetal and cause the depolymerized products to pass from said greenbody.

2. The process of claim 1 wherein said acid is contacted with said greenbody in the form of an acid gas.

3. The process of claim 1 wherein said acid is selected from the group consisting of sulfuric, nitric and hydrochloric acids.

4. The process of claim 2 wherein said acid gas is contacted with said ceramic greenbody at a temperature of from 70° to 200° C.

5. The process of claim 4 wherein said acid gas is contacted with said ceramic greenbody at a temperature of from 80° to 120° C.

6. The process of claim 1 wherein said polyacetal binder comprises oxymethylene units.

7. The process of claim 6 wherein said polyacetal contains at least 50 mol % oxymethylene units.

8. The process of claim 6 wherein said polyacetal is a copolymer containing oxymethylene units and oxyalkylene units wherein said alkylene group contains at least 2 carbon atoms.

9. The process of claim 8 wherein said polyacetal binder comprises a copolymer containing at least 50 mol % oxymethylene units and the remainder oxyethylene units.

10. The process of claim 1 wherein said sinterable powder is selected from the group consisting of aluminum oxide, zirconium oxide, silicon dioxide, silicon nitride, silicon carbide, silicon, ferrite and mixtures thereof.

11. The process of claim 10 wherein said sinterable powder is silicon.

12. The process of claim 1 wherein said polyacetal binder comprises from about 10 to 50 wt. % of said ceramic composition.

13. A process for producing ceramic articles comprising mixing a sinterable powder and a polyacetal binder to form a moldable ceramic composition, extrusion or injection molding said ceramic composition to form a ceramic greenbody and removing said binder from the greenbody by contacting the greenbody with an acid which reacts with said polyacetal binder to depolymerize said binder.

14. The process of claim 13 wherein said sinterable powder comprises from about 50 to about 87 volume % of said mixture.

15. The process of claim 13 wherein said acid is comprised of an acid gas.

16. The process of claim 13 wherein said acid is selected from the group consisting sulfuric, nitric and hydrochloric acids.

17. The process of claim 15 wherein said acid gas is contacted with said ceramic greenbody at a temperature of from 70° to 200° C.

18. The process of claim 17 wherein said acid gas is contacted with said ceramic greenbody at a temperature of from 80° to 120° C.

19. The process of claim 13 wherein said polyacetal contains at least 50 mol % oxymethylene units.

20. The process of claim 13 wherein said sinterable powder is selected from the group consisting of aluminum oxide, zirconium oxide, silicon dioxide, silicon nitride, silicon carbide, silicon, ferrite and mixtures thereof.

21. The process of claim 13 wherein said sinterable powder is silicon.

22. The process of claim 15 wherein said acid gas is contacted with said greenbody in an inert carrier gas.

23. The process of claim 13 wherein said polyacetal binder comprises from about 10 to 50 wt. % of said ceramic composition.

24. The process of claim 1 wherein said sinterable powder comprises from about 50 to about 87 volume % of said mixture.

25. A process for producing ceramic articles comprising mixing a sinterable powder and a polyacetal binder to form a moldable ceramic composition containing from about 50 to about 87 vol. % of said sinterable powder, extrusion or injection molding said ceramic composition to form a ceramic greenbody and removing said binder from the greenbody by contacting the greenbody with an acid gas at a temperature of from 70° to 200° C. to react with said polyacetal binder to depolymerize said binder.

* * * * *